Sept. 11, 1962 J. F. TOWLER 3,054,058

CONVERTER AND METHOD OF SIGNAL CONVERSION

Filed Aug. 2, 1957 2 Sheets-Sheet 1

Inventor:
James F. Towler,
by Gust & Irish
Attorneys.

(a)

| | FM CHANNEL | LOCAL OSC. | I.F. TRANSFORMER | | |
|---|---|---|---|---|---|
| | | | OSC. 2d HAR (2×$f_2$) | I.F. $f_1 \pm f_2$ | |
| | $f_1$ | $f_2$ | $f_3$ | $f_4$ | |
| EXAMPLE-1 | 100 M.C. | 31.83 M.C. | 63.66 M.C. | 68.16 M.C. | TV CHANNEL-#3 |
| EXAMPLE-2 | 100 | 95.50 | 191.00 | 195.50 | TV CHANNEL #10 |

| TV CHANNEL | | INTERCARRIER | |
|---|---|---|---|
| VIDEO | AUDIO | FREQUENCY | |
| $f_5$ | $f_6$ | ($f_6 - f_5$) $f_7$ | |
| 63.66 M.C. | 68.16 M.C. | 4.5 M.C. | TV CHANNEL #3 |
| 191.00 M.C. | 195.50 M.C. | 4.5 M.C. | TV CHANNEL #10 |

Inventor:
James F. Towler,
by Gust & Irish
Attorneys.

United States Patent Office 3,054,058

Patented Sept. 11, 1962

3,054,058

CONVERTER AND METHOD OF SIGNAL CONVERSION

James F. Towler, Indianapolis, Ind., assignor to Industrial Development Engineering Associates, Inc., Indianapolis, Ind.

Filed Aug. 2, 1957, Ser. No. 675,972
18 Claims. (Cl. 325—451)

The present invention relates to a converter and a method of signal conversion, and more particularly to a converter for use as an accessory device with a conventional home television receiver whereby the latter may be utilized to receive frequency modulated transmissions on the standard television channels, which transmissions occur at frequencies other than those of such television channels.

The standard broadcast band over which frequency modulated signals are transmitted ranges from 88 to 108 megacycles. The frequency spectrum covered by the standard commercial television channels extends both below and above this frequency-modulation spectrum, respectively. This being true, it is impossible to receive on a conventional television receiver frequency modulated signals which are transmitted in the 88 to 108 megacycle spectrum. For example, television channel 3 has a frequency range of 60 to 66 megacycles which falls considerably below the frequency-modulation band, whereby it is obviously impossible to receive any signals transmitted in the frequency modulation (FM) band on this television channel 3.

Inasmuch as conventional television receivers utilize the well-known intercarrier sound system, it is not possible by the simple expedient of a local oscillator heterodyned with the frequency modulation signal to produce a difference frequency falling within the area of the television channel to produce a signal directly utilizable by the television receiver for reproducing the sound of the frequency modulation signal. The television receiver itself depends upon the frequency difference in the particular television channel between the video and audio carrier frequencies to separate the video and sound signals into separate circuit channels for individual reproduction. Thus, a suitable converter or heterodyning device must produce two signal frequencies corresponding to the video and audio carrier frequencies, respectively.

It is an object of this invention to provide a method for converting signals of one frequency to a frequency which may be utilized by a television receiver having an intercarrier sound system.

It is another object of this invention to provide a converter which may be used in conjunction with a conventional television receiver whereby standard broadcast FM signals may be received on the conventional television channels of the television receiver.

It is another object of this invention to provide an FM converter for a television receiver which may be coupled to the antenna input terminals of the receiver for adapting the latter to FM reception while the receiver is tuned to the conventional television channels.

It is still another object of this invention to provide a simple and inexpensive FM converter for a television receiver, which generates two signals of different frequency corresponding respectively to the frequencies of the standard video and audio carriers. In the standard television system, the video and audio carriers are separated by four and a half megacycles. Thus, the two signals generated by the converter must be separated by this amount.

Other objects will become apparent as the description proceeds.

In accordance with this invention there is provided a converter comprising a tuned circuit, a detector coupled to said tuned circuit, an oscillator coupled to the detector, a mixer for mixing the signals of both the detector and oscillator for providing an intermediate frequency signal, the tuned circuit being adjusted to a first frequency, the oscillator being tuned to a second frequency, the heterodyne of the first and second frequencies equalling the frequency of the video carrier frequency of a given television channel, and the frequency of the second harmonic of the oscillator differing from the first-mentioned heterodyne frequency by four and one-half (4.5) megacycles.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
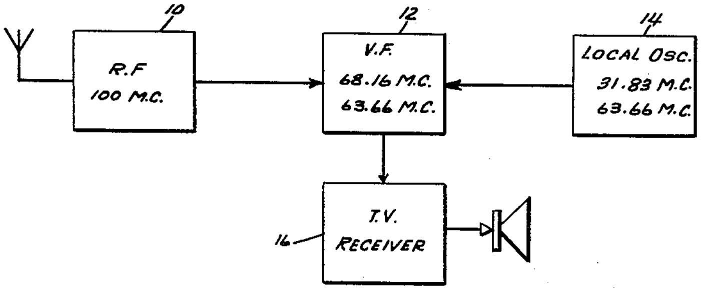
FIG. 1 is a block diagram illustrating the embodiment of this invention.

Referring to the drawings, and more particularly to FIG. 1, a resonant or tuned circuit 10 is coupled to a heterodyning circuit 12. Also coupled to the heterodyning circuit 12 is a local oscillator 14. Assuming for the moment that the frequency of the FM station being received is 100 megacycles, the fundamental frequency of the local oscillator is selected as 31.83 megacycles. These two signals at 100 and 31.83 megacycles, respectively, are heterodyned in the circuit 12 producing a difference frequency of 68.16 megacycles. This difference frequency of 68.16 megacycles is coupled to the antenna terminals of the television receiver 16 and corresponds to the carrier frequency of the audio signal of the television channel number 3. Simultaneously with the generation of the local oscillator signal of 31.83 megacycles, the oscillator 14 also provides the second harmonic of this signal, which occurs at a frequency of 63.66 megacycles. This second harmonic is also coupled through the heterodyning circuit 12 to the television receiver 16, and as will be noted, the frequency of the second harmonic differs from the heterodyned signal just described by precisely 4.5 megacycles. Thus, the second harmonic occurs at precisely the same frequency as the picture carrier for the aforementioned television channel number 3.

Thus, two signals at different frequencies are fed to the television receiver 16, one signal being at the video carrier frequency (63.66 megacycles) and the other being at the frequency of the audio carrier (68.16 megacycles). The signal occurring at the audio carrier frequency contains the audio information to be reproduced by the television receiver, while the signal occurring at the video carrier frequency carries no information whatsoever and may thereby be characterized as a phantom or simulated picture carrier.

The television receiver 16 is of conventional design, such as the Capehart models CX37 and CX38, which utilize the intercarrier sound system for separating the video and audio portions of the composite television signal. The receiver itself inherently separates the audio and video signals and conventionally reproduces the audio information through its sound system.

Figure 2:
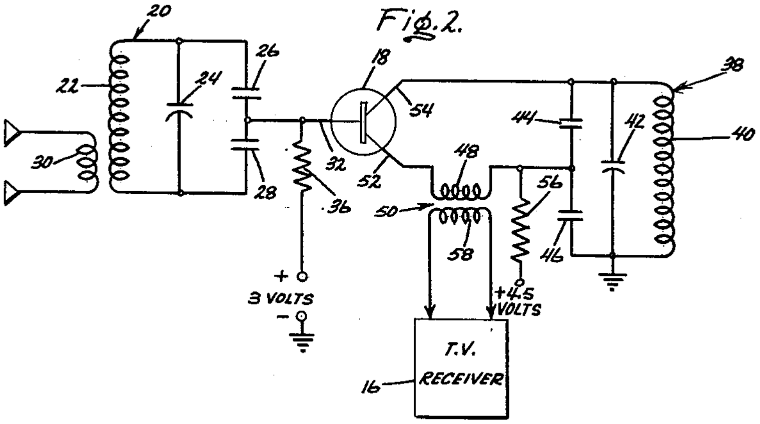
FIG. 2 is a circuit diagram of a specific embodiment of this invention.
Figure 3:
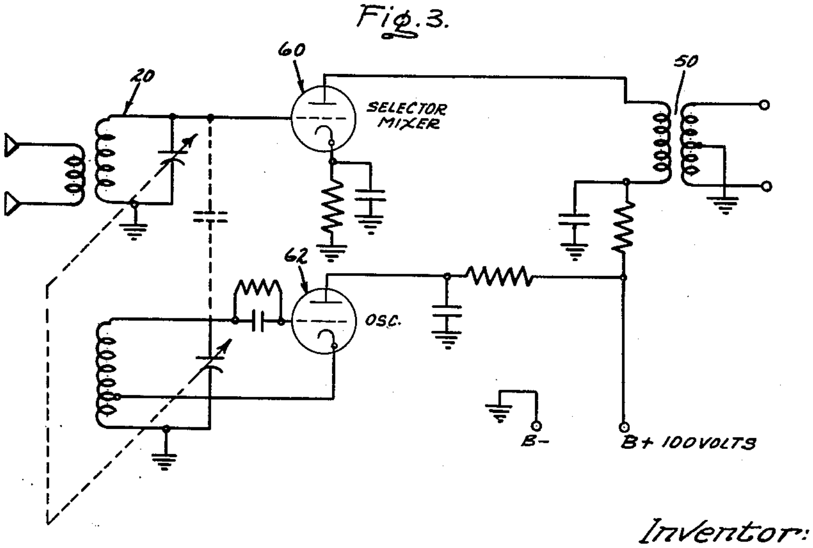
FIG. 3 is a circuit diagram of a second embodiment of this invention.

Specific circuits for accomplishing the operation asoutlined for FIG. 1 are illustrated in FIGS. 2 and 3. FIG. 2 is preferred in some instances because of its compactness and extreme simplicity, only a single transistor 18 being required. A tuned or resonant circuit generally indicated by the reference numeral 20 is composed of an inductor 22, a shunt-connected variable capacitor 24, and two condensers 26 and 28 connected in series across the capacitor 24. These condensers 26 and 28 may be considered as constituting a voltage-dividing and matching network for coupling the resonant circuit 20 to the transistor 18. A suitable antenna coil 30 is inductively coupled to the inductor 22 for coupling frequency modulated signals from the antenna into the tuned circuit 20.

The base element 32 of the transistor 18 is connected to the junction of the two condensers 26 and 28 and also to a resistor 36.

A second tuned circuit is generally indicated by the reference numeral 38 and comprises an inductor 40 and a shunt-connected tuning capacitor 42. Two capacitors 44 and 46 are connected in series and in turn are shunt-connected across the variable capacitor 42. To the junction of the two capacitors 44 and 46 is connected one end of the primary winding 48 of an intermediate frequency transformer or output circuit 50. The other end of this winding 48 is connected to the emitter element 52 of the transistor. The remaining collector element 54 of the transistor is connected to the upper end of the tank circuit 38. A biasing resistor 56 extends from the right-hand end of the winding 48 to the positive terminal of a biasing battery.

The secondary winding 58 of the transformer 50 is provided with leads extending from the opposite ends thereof, which are connected to the antenna terminals of the television receiver 16.

The capacitors 24 and 42 may be ganged together for simultaneous tuning for selecting different frequencies to be received.

In operation, the transistor 18 in combination with the tuned circuit 20 constitutes a detecting and mixing circuit for the FM signal applied to the antenna coil 30. Assuming that the frequency of the frequency modulated signal being reecived is 100 megacycles, the tuned circuit 20 is resonated at this frequency, coupling the signal thereof to the base element of the transistor 18.

The tank circuit 38 in combination with the transistor 18 and the remaining circuit connections constitute an oscillator which generates a signal at a precisely selected figure. In the present instance, the frequency of the local oscillator signal should be 31.83 megacycles. Also, this oscillator circuit is so designed as to generate a second harmonic of the fundamental frequency signal; however, no special means are necessary for generating this second harmonic since the signal normally generated by the oscillator inherently includes the second harmonic.

The received 100-megacycle FM signal as detected is heterodyned with the fundamental frequency signal of the oscillator thereby producing a difference frequency of 68.16 megacycles which precisely coincides with the audio carrier frequency of television channel number 3. This heterodyned signal is coupled from the circuit by means of the transformer 50 to the antenna terminals of the television receiver 16. In addition to coupling this difference frequency signal to the television receiver antenna terminals, the transformer 50 also couples the second harmonic, namely 63.66 megacycles, from the circuit to the television receiver. Thus, a simulated picture carrier as well as the audio signal occurring at the audio carrier frequency are coupled to the television receiver which thereafter conventionally utilizes these signals for reproducing the audio.

Figures 4, 5:
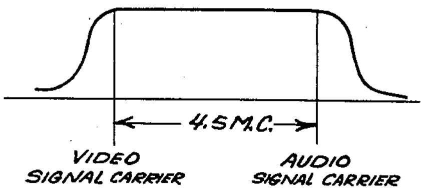
FIG. 4 is a chart illustrating the arrangement of frequencies utilized in the design of this invention.
FIG. 5 is a waveform illustrating the conventional signal-frequency distribution of a conventional television channel.

Reference may be made to FIGS. 4 and 5 for a clearer understanding of the various frequency relationships just described. Example No. 1 in FIG. 4*a* shows in chart form the necessary frequency relationships for receiving a frequency modulated signal occurring at a carrier frequency of 100 megacycles. In this instance, the local oscillator frequency must be precisely set at 31.83 megacycles whereupon the second harmonic of the local oscillator frequency coincidentally falls at 63.66 megacycles. Heterodyning the 100-megacycle signal with the local oscillator signal of 31.83 megacycles produces an intermediate or difference frequency of 68.16 megacycles, also coincidentally.

The chart of FIG. 4*b* illustrates the necessary carrier frequency relationships between the video and audio components of a particular television channel, Example No. 1 for television channel number 3 requiring a video carrier frequency of 63.66 megacycles and an audio carrier frequency of 68.16 megacycles. Heterodyning these two carrier frequencies results in the production of a third frequency, denoted "$f_7$," of 4.5 megacycles which corresponds identically to the necessary frequency difference utilized by the intercarrier sound system in the television receiver for reproducing the audio.

In Example No. 2 of FIGS. 4*a* and 4*b*, the charts demonstrate that the same frequency modulated signal occurring at 100 megacycles may be received on telesion channel number 10 by setting the local oscillator frequency at 95.50 megacycles whereupon the second harmonic falls at 191.00 megacycles. The difference frequency, which in this instance constitutes a summation, between the received signals at 100 megacycles and the oscillator signal at 95.50 megacycles then becomes 195.50 megacycles, as shown. The two signals occurring at 191.00 megacycles and 195.50 megacycles differ by only 4.5 megacycles, thereby being directly utilizable by the television receiver for reproducing the audio.

FIG. 5 illustrates the relative spacing between the video and audio signal carriers for any given television channel as being 4.5 megacycles as required by the standard television system.

Now to be explained is the method by which the particular oscillator frequencies may be calculated for any given frequency modulated signal to be received. Assuming again that the carrier frequency of the FM signal to be received is 100 megacycles, the first step in the calculation is to subtract 4.5 megacycles from the 100-megacycle cycle, leaving a difference of 95.5 megacycles. This figure of 95.5 megacycles is then divided by three (3), providing a quotient of 31.83 megacycles, the local oscillator frequency. As already explained, when the local oscillator frequency is set at 31.83 megacycles, television channel number 3 may be used for reproducing the FM signal.

In the event it is desired to use a higher television channel, for example, channel number 10, for receiving the FM signal occurring at 100 megacycles, the same procedure is followed of subtracting 4.5 megacycles from the given 100-megacycle figure. This leaves a difference of 95.5 megacycles which is directly taken as the local oscillator frequency. As will be noted in the chart of FIG. 4*a*, this frequency of 95.50 megacycles is taken as the local oscillator frequency. Thus, depending upon design preferences, the local oscillator may be tuned to desired frequencies for enabling reception on either the high or low frequency television channels.

In FIG. 3 is illustrated another embodiment of this invention which utilizes two vacuum tubes 60 and 62 in place of the transistor of FIG. 2. The tube 60 is a triode and is operatively coupled to the tuned circuit 20 as a combination detector and mixer. The tube 62 is also a triode and is coupled into a conventional oscillator network. The detected signal from the triode 60 as well as the oscillator signal from the triode 62 are heterodyned and coupled by means of the transformer 50 to the antenna terminals of the television receiver. The operation of this circuit is substantially identical to that of FIG. 2, the fundamental of the oscillator being heterodyned with the detected signal to produce the audio signal carrier for the television receiver and the second harmonic from the oscillator being directly coupled to the antenna terminals of the television receiver as the simulated picture carrier. In order to facilitate tuning of the circuits of FIGS. 2 and 3, the variable condensers may be ganged.

By way of example only, and not by way of limiting the scope of this invention, parts values for one specific embodiment of this invention are given in the following for the circuit of FIG. 2.

| | |
|---|---|
| Condenser **24** | 5 to 20 mmfd. |
| Condenser **26** | 36 mmfd. |
| Condenser **28** | 36 mmfd. |
| Resistor **36** | 10,000 ohms. |
| Transistor | Type No. SB-100. |
| Condenser **44** | 18 mmfd. |
| Condenser **46** | 30 mmfd. |
| Condenser **42** | 5 to 20 mmfd. |
| Resistor **56** | 4,700 ohms. |

While the invention has been explained for the instance in which the second harmonic only of the local oscillator has been used as the inserted or phantom picture carrier, it is of course possible to use two separate oscillators for supplying the first signal at frequency "$f_2$" (FIG. 4*a*) and the second signal at frequency "$f_3$." Also, this invention as disclosed is not limited to use of the second harmonic of the local oscillator signal but instead may utilize the third or other harmonics. For example, starting with Example No. 1 of FIG. 4, the third harmonic of local oscillator frequency "$f_2$" (31.83) is, for all practical purposes, 95.5 megacycles. The heterodyne of this 95.5 megacycle signal with an FM 100 megacycle signal provides a signal at 195.5 megacycles. The sixth harmonic of "$f_2$" (31.83 mc.) is 191.0 megacycles, and this signal is only 4.5 megacycles removed from the heterodyne of 195.5 megacycles.

What is claimed is:

1. A converter comprising a tuned circuit, a detector coupled to said tuned circuit, an oscillator coupled to said detector, means for mixing the signals of said detector and said oscillator for providing an intermediate frequency signal, said circuit being tuned to a first frequency, said oscillator being tuned to a second frequency, the heterodyne of said first and second frequencies equalling the frequency of the audio carrier frequency of a given television channel, and the frequency of the second harmonic of said oscillator differing from the first-mentioned heterodyne frequency by four and one-half (4.5) megacycles.

2. A converter comprising a tuned circuit, a detector coupled to said tuned circuit, an oscillator operatively coupled to said detector, means for mixing the signals of said detector and said oscillator for providing an intermediate frequency signal, an output-coupling network operatively coupled to both said detector and oscillator, said circuit being tuned to a first frequency, said oscillator being tuned to a second frequency, the heterodyne of said first and second frequencies equalling the frequency of the audio carrier frequency of a given television channel, and appearing in said output-coupling network, the second harmonic frequency of said oscillator appearing in said output-coupling network, and the frequency of the second harmonic of said oscillator differing from the first-mentioned heterodyne frequency by four and one-half (4.5) megacycles.

3. A converter comprising circuit means tuned to a signal of first frequency, first means operatively coupled to said circuit means for detecting the signal thereof, an oscillator for generating a signal of second frequency and the second harmonic thereof, second means intercoupling said first means and said oscillator for heterodyning the signals thereof, said second means including an output circuit across which the heterodyned signal appears, the heterodyne frequency equalling the frequency of the audio carrier frequency of a given television channel, and the frequency of the second harmonic differing from said carrier frequency by an amount equal to the intercarrier sound frequency for said given channel.

4. A converter comprising circuit means tuned to a signal of first frequency, first means operatively coupled to said circuit means for detecting the signal thereof, an oscillator for generating a signal of second frequency and the second harmonic thereof, second means intercoupling said first means and said oscillator for heterodyning the signals thereof, said second means including an output circuit across which the heterodyned signal appears, the heterodyne frequency equalling the frequency of the audio carrier frequency of a given television channel, and the frequency of the second harmonic differing from said carrier frequency by four and one-half (4.5) megacycles.

5. A converter comprising a mixer, circuit means providing a signal of first frequency, said circuit means being operatively coupled to said mixer, signal source means providing two signals of second and third frequencies respectively, an output circuit, said mixer being operatively coupled to said output circuit, said signal source means being operatively coupled to said mixer, said mixer heterodyning said first and second frequency signals, said first and second frequencies differing by an amount equal to the frequency of the audio carrier of a given television channel, said third frequency being equal to the frequency of the video carrier of said television channel.

6. A converter comprising a resonant circuit tuned to a first frequency, a transistor having base, collector and emitter elements, a tank circuit tuned to a second frequency, said elements being operatively coupled to said resonant circuit to provide a signal detector and mixer, said tank circuit being operatively coupled to said elements to provide an oscillator, said oscillator providing a signal at said second frequency and a second harmonic thereof, an output circuit operatively coupled to said signal detector and mixer, said first and second frequency signals differing by an amount equal to the frequency of the audio carrier of a given television channel, said second harmonic having a frequency equal to that of the video carrier of said television channel.

7. A converter comprising a resonant circuit tuned to a first frequency, a transistor having a base, collector and emitter elements, a tank circuit, said base element being coupled to said resonant circuit, said collector and emitter elements being coupled to different voltage points on said tank circuit, an intermediate frequency transformer connected in series with said emitter element and said tank circuit, circuit means including said transistor and resonant circuit for providing a signal detector, circuit means including said transistor and said tank circuit for providing an oscillator which generates a signal at a second frequency and the second harmonic thereof, said first and second frequency signals differing by an amount equal to the frequency of the audio carrier of a given television channel, said second harmonic having a frequency equal to that of the video carrier of said television channel.

8. The method of frequency conversion comprising the steps of heterodyning a signal to be received with a second signal, generating a third signal at a frequency removed from the frequency of the heterodyned signal by four and one-half (4.5) megacycles, the frequency of the heterodyned signal coinciding with the audio carrier frequency of a given television broadcasting channel, the frequency of the third signal coinciding with the video carrier frequency of said channel, and utilizing the heterodyne and third signals for reproducing the information on said signal to be received.

9. The steps in the method of receiving a signal on a television receiver having an intercarrier sound system of: heterodyning said signal with a second signal of such frequency as will provide a heterodyne signal at the frequency of the audio carrier of a given television channel, generating a third signal at a frequency corresponding to the video carrier frequency of said television channel, and utilizing the heterodyne and third signals for reproducing the information on the first-mentioned signal.

10. The steps in the method of receiving a signal on a television receiver having an intercarrier sound system of: generating a second signal at a predetermined frequency, heterodyning a component of said second signal with the signal to be received to produce a heterodyne signal, the frequency of said heterodyne signal coinciding with the audio carrier frequency of a given television broadcasting channel, multiplying the frequency of said second signal to a frequency coinciding with the video carrier frequency of said channel, and utilizing said heterodyne and multiplied frequency signals to reproduce the information on said signal to be received.

11. A converter comprising a signal source, an oscillator operatively coupled to said signal source, said oscillator providing a signal displaced in frequency from the frequency of said signal source, a source of signal oscillations having a frequency which differs by 4.5 megacycles from the heterodyne frequency of said oscillator and signal source frequencies, means for mixing said oscillator and signal source frequencies to provide said heterodyne frequency, and utilization circuit means operatively coupled to said mixer and said source of signal oscillations for utilizing the mixed oscillator and signal source frequencies.

12. A converter comprising a signal source, an oscillator operatively coupled to said signal source, said oscillator providing a signal displaced in frequency from the frequency of said signal source, a source of signal oscillations having a frequency which differs from the heterodyne frequency of said oscillator and signal source frequencies by a predetermined frequency interval, means for mixing said oscillator and signal source frequencies to provide said heterodyne frequency, and utilization circuit means operatively coupled to said mixer and said source of signal oscillations for utilizing the mixed oscillator and signal source frequencies.

13. A converter comprising a resonant circuit tuned to a first frequency, a transistor having base, collector and emitter elements, a tank circuit, said base element being coupled to said resonant circuit, said collector and emitter elements being coupled to different voltage points on said tank circuit, an intermediate frequency transformer having primary and secondary windings, the primary winding being connected in series between the emitter element and said tank circuit, a source of potential connected to said emitter element, a source of potential connected to said base element, said tank circuit in combination with said transistor providing an oscillator which generates a signal at a second frequency and the second harmonic thereof, said first and second frequency signals differing by an amount equal to the frequency of the audio carrier of a given television channel, said second harmonic having a frequency equal to that of the video carrier of said television channel.

14. A converter comprising a tuned circuit, a mixer including a first tube having an anode, a control grid and a cathode, said control grid being coupled to said tuned circuit, an intermediate frequency transformer having primary and secondary windings, said primary winding being connected in series with said anode and a source of supply potential, an oscillator including a second tube having an anode, a control grid and a cathode, a variable frequency tank circuit coupled to said second tube grid, said second tube anode being coupled to the side of said primary winding opposite the first tube anode, said tuned circuit in combination with said mixer being tuned to a first frequency, said oscillator being tuned to a second frequency, the heterodyne of said first and second frequencies equalling the frequency of the audio carrier frequency of a given television channel and appearing in the secondary winding of said transformer, the second harmonic frequency of said oscillator appearing in said secondary winding, and the frequency of said second harmonic differing from said heterodyne frequency by four and one-half (4.5) megacycles.

15. A converter comprising a tuned circuit, a mixer including a first tube having an anode, a control grid and a cathode, said control grid being coupled to said tuned circuit, an intermediate frequency transformer having primary and secondary windings, said primary winding being connected in series with said anode and a source of supply potential, an oscillator including a second tube having an anode, a control grid and a cathode, a variable frequency tank circuit coupled to said second tube grid, said second tube anode being coupled to the side of said primary winding opposite the first tube anode, said tuned circuit in combination with said mixer being tuned to a first frequency, two ganged tuning capacitors, one capacitor being operatively coupled into said tuned circuit, the other capacitor being operatively coupled into said oscillator, said oscillator being tuned to a second frequency, the heterodyne of said first and second frequencies equalling the frequency of the audio carrier frequency of a given television channel and appearing in the secondary winding of said transformer, the second harmonic frequency of said oscillator appearing in said secondary winding, and the frequency of said second harmonic differing from said heterodyne frequency by four and one-half (4.5) megacycles.

16. A converter comprising a signal source, circuit means having input and output circuits, said signal source being coupled to said input circuit, said signal source providing a first signal of first frequency, said circuit means including an oscillator providing second and third signals, said second signal having a second frequency, said third signal having a third frequency which is the second harmonic of said second signal, said circuit means further including mixing means for heterodyning said first and second signals to provide a heterodyned signal of fourth frequency, and means included in said circuit means for coupling said heterodyned signal and said third signal to said output circuit, the frequencies of said heterodyned signal and said third signal differing by an amount equal to the frequency of the audio carrier of a given television channel, said third signal having a frequency equal to that of the video carrier of said television channel.

17. The converter of claim 16 wherein said heterodyned signal and said third signal differ in frequency by 4.5 megacycles.

18. The steps in the method of receiving a signal on a television receiver having an intercarrier sound system of: heterodyning said signal with a second signal of such frequency as will provide a heterodyne signal at the frequency of the audio carrier of a given television channel, generating a third signal at a frequency corresponding to the video carrier frequency of said television channel, and applying the heterodyne and third signals to the antenna terminals of a television receiver having an intercarrier sound system.

References Cited in the file of this patent

UNITED STATES PATENTS 2,468,041 Couillard ............ Apr. 26, 1949

OTHER REFERENCES

Publication I, Radio and TV News, July 1957, pages 108–109.

Publication II, Radio Electronics, March 1957, pages 97 and 100.